United States Patent [19]

Degenkolb et al.

[11] 4,159,930

[45] Jul. 3, 1979

[54] PROCESS FOR RECOVERING HEAVY METAL IONS FROM DILUTE AQUEOUS SOLUTION

[75] Inventors: David J. Degenkolb, Granada Hills; Fred J. Scobey, Hollywood, both of Calif.

[73] Assignee: De luxe General, Incorporated, Los Angeles, Calif.

[21] Appl. No.: 943,839

[22] Filed: Sep. 19, 1978

Related U.S. Application Data

[63] Continuation-in-part of Ser. No. 826,571, Aug. 22, 1977, abandoned.

[51] Int. Cl.$^2$ ............................ C01G 5/00; C25C 1/20; C01G 37/14; C01G 49/00
[52] U.S. Cl. ..................................... 204/111; 423/24; 423/42; 423/54; 423/139
[58] Field of Search ........ 423/24, 42, 658.5, DIG. 14, 423/54, 139; 75/101 BE, 118 P; 210/32, 37 B, 38 B; 204/111

[56] References Cited

U.S. PATENT DOCUMENTS

| 2,839,389 | 6/1958 | Kember et al. ...................... 423/139 |
| 2,965,441 | 12/1960 | Welton .................................. 423/24 |
| 3,664,950 | 5/1972 | Saraceno et al. ...................... 423/54 |
| 4,049,772 | 9/1977 | Takada .................................. 423/54 |

FOREIGN PATENT DOCUMENTS

| 2355677 | 5/1974 | Fed. Rep. of Germany ............. 423/24 |
| 50-63268 | 11/1975 | Japan .......................................... 423/54 |
| 626081 | 7/1949 | United Kingdom ....................... 423/24 |

OTHER PUBLICATIONS

Lindeman et al., "Wiedergewinnung von Silber aus verdunnten photographischen Fixierbadlosungen", Chem. Techn. 11, pp. 147–149.

Primary Examiner—Brian Hearn
Attorney, Agent, or Firm—Harry R. Lubcke

[57] ABSTRACT

A process for treating very dilute solutions containing ecologically noxious heavy metal ions, in which the solutions are made acceptable for return to the environment, and the typically valuable heavy metal present in the solution is recovered at an economic profit. The dilute solution is flowed through an ion exchange resin, as a cross-linked polystyrene having quaternary ammonium functional groups which hold the heavy metal ions, allowing an ecologically benign effluent to return to the environment or the water to be re-used in industrial processing. Typically, an alkali metal halide is subsequently placed in contact with the resin to recover the heavy metal ion for subsequent reduction to a solid.

16 Claims, No Drawings

PROCESS FOR RECOVERING HEAVY METAL IONS FROM DILUTE AQUEOUS SOLUTION

This is a continuation-in-part of application Ser. No. 826,571, filed Aug. 22, 1977, now abandoned.

BACKGROUND OF THE INVENTION

This invention pertains to metallurgy, and more specifically to separating out heavy metal ions from a solution.

The prior art has disclosed processes for removing heavy metal ions from a solution; usually from a solution of nominal concentration rather than from a solution of very weak concentration.

The heavy metal ion silver-complex occurs in certain solutions that are used for developing black and white or color photographic film and persists in very dilute concentration in wash waters, such steps being interposed in the processing.

The silver is in the form of silver thiosulfate anionic complexes.

A process reported in the early British Pat. No. 626,081 recovers silver from such spent sodium thiosulfate ("hypo") solutions, or from the wash water that is employed in such processing.

A polyakylene polyamine aliphatic amin resin absorbs the silver ion. Thereafter this resin must be successively treated with ammonium hydroxide, hydrochloric acid, and again with ammonium hydroxide to remove the silver ion from the resin. This is to regenerate the resin so that the silver anionic complex can again be absorbed by the resin from further dilute solution.

This process, when utilized to recover the silver ion from a dilute solution, required an impractically slow flow rate. Also, the recovery of the silver from the resin was only 52%.

All of the technology reported in this British Pat. no. 626,081 was conducted with small laboratory apparatus, having only 200 milliliters of resin.

A paper, "Recovery of Silver from Diluted Photographic Fixing Bath Solutions", in German, by two East German investigators, J. Lindeman and T. Rabek, was published in "Chem. Techn.", Vol 11, issue Mar. 3, 1959.

Tests were made upon a laboratory scale, employing only 20 milliliters of resin in a glass column.

"The absorption of silver from solutions containing 50, 300 and 750 milligrams of Ag/liter was investigated; the mol ratio Ag: $S_2O_3$ was equal to 1:2, 1:4 or 1:10." However, results are only given for the 750 (and 700) values of Ag/liter. Such values are high and are of absolutely no significance ecologically.

Another paper, "Removal of Residual Silver from Processing Wastewater by Ion Exchange", by Daniel G. Marsh, was very recently published in the "Journal of Applied Photographic Engineering", V 4, No. 1, Winter 1978, pp 17–21.

Tests were again made on a laboratory scale, employing only 40 milliliters of resin in a glass column.

The problem solved by the reference had to do with high levels of silver effluent in a portable photographic processing laboratory of the U.S. Army, and treatment thereof to allow reasonable compliance with local sewer effluent rules.

In either of these papers there is no mention of the suitability of the treated effluent for re-use in the processing operation.

Relatively recently a paper, "Ion Exchange Polymers" by Irving M. Abrams, Ph.D., and Leo Benezra, forming a portion of the "Encyclopedia of Polymer Science & Technology", 1967, John Wiley & Sons, Inc., has on page 739:

"Although laboratory tests might be useful for comparative purposes, there is no substitute for complete field testing."

This conclusion was reinforced recently, as is known to the trade in Hollywood, when an ion exchange silver recovery system was installed in a commercial motion picture film-developing laboratory. However, the physio-chemical aspect of the resin packing together seriously reduced the flow of solution to be treated after a few weeks of use. This caused a backup of the outflow solution from the processing machine and spoiled the film being processed. As a result the recovery system was summarily removed from the plant.

The U.S. Pat. No. 3,829,549 discloses a regard for the environment with respect to the silver ion in the relatively very high concentration of the usual spent hypo solution. The silver is recovered from the spent solution so that the resulting effluent can be discharged into a sewer or stream without polution.

Silver chloride is precipitated.

The U.S. Pat. No. 3,960,565 utilizes the combination of a water-soluble ferric compound with a halide ion and an oxidizing inorganic ion in aqueous solution, such as sodium nitrate. This acts upon the silver ion complex from a photographic fixing bath so that the complex can be recovered by known silver recovery techniques, as stated in the patent.

Further recent very small-scale experimental procedures have been undertaken for the absorption of silver by ion-exchange resins.

This has involved bleach-fix solutions, as the paper "Regeneration of Ferric-EDTA-Thiosulfate Bleach-Fix Solution by Anion-Exchange Resins", H. Iwano et al (Japan), "Journal of Applied Photographic Engineering", Vol 2, No. 2, pgs. 65–69, Spring 1976.

This procedure has been for a spent bleach-fix solution containing 4.32 grams of silver per liter. This is one-hundred million times more silver than the minimum amount that can be processed with the present invention.

The Iwano paper concludes with the statement:

"The new regeneration system presented here still has some problems that have to be solved before introduction to practical applications but it may provide an improvement for pollution abatement."

The British Pat. No. 1,452,618, published Oct. 13, 1976, sets forth the same technology as the above paper, having the same authorship and two of the same tables of data, as well as a great similarity in the data disclosed.

The examples given in the patent do not give quantities of chemicals, etc., nor the volume of solution that can be processed. It appears that the same very small scale experimental procedures as used in the paper are involved. A 10 milli-liter resin column was used in the experiments reported in the paper.

By contrast, a commercial installation according to the subject invention employs 12,165,000 milli-liters of resin.

Further prior art efforts include a paper approved for public release, distribution unlimited, by the Air Force Weapons Laboratory, New Mexico; "Development and Application of Ion Exchange Silver Recovery System", by A Buyers et al, May 1974.

The "Conclusions" of the paper contain certain information, such as:

"1. a. (4) Operation of an ion exchange process for removal of silver concentrations of 0.05 grams per liter or less requires over ten times the quantity of resin as found by Buyers (ref. 3); this quantity is probably impractical for Air Force applications. Therefore, the ion exchange process should be evaluated at fix bath concentrations between 0.05 gm/liter and 0.50 gm/liter."

Note that the minimum concentration of the Air Force work, 0.05 gm/liter is 50 parts per million, or 1,250 times greater than the minimum concentration capable of being processed by the present invention.

SUMMARY OF THE INVENTION

A commercially practical cost-effective continuous-flow heavy metal ion recovery system capable of handling very dilute aqueous solutions of the ion has been accomplished by employing certain combinations of chemicals and processing techniques.

An anion-exchange resin supplied as a gel or a macroporous grain structure is used. This may be a strong base cross-linked polystyrene having quaternary ammonium functional groups. It is supplied in the chloride mode as a granular bed. A weak base polyfunctional amine phenolic resin may alternately be used.

Illustratively, the dilute aqueous solution containing the silver anion is flowed through the resin and the silver anion is absorbed by the resin.

After a period measured in many hours the silver anion may be removed from the resin by a .5 molal solution of ammonium chloride, or preferably by such a solution that has been previously used one or several times. The used solution contains an ammonium chloride-thiosulfate complex and gelatin.

At infrequent intervals the resin can be physically expanded and unpacked in the resin bed by imposing an alkali metal hydroxide, such as a 4% solution of sodium hydroxide, for an hour. This preserves a desirably relatively high flow rate for the process.

A factor in attaining cost-effectiveness is that all of the materials involved have a very long life, being effective for numerous cycles; or that an inexpensive regenerant can be employed, sodium chloride.

The process of this invention is effective in handling nexious solutions from 1,250 times to 100,000,000 times more dilute than has been possible with the processes of the prior art.

Plural kinds of heavy metal ions can be recovered by the process; such as silver; iron as ferricyanide or ferrocyanide, and chromium as dichromate.

Sodium chloride is an alternate regenerative ellutant.

The process is notable in functioning to dilutions of 0.04 to 25 parts per million (equivalent to the same numerical values in milligrams per liter), also in the presence of significantly higher levels of the thiosulfate ion, and with a greater selection of resins than has been possible in the prior art.

The process has been in commercial operation at plural locations in industry and the effluent has been independently tested as to ecological efficacy by government representatives.

Ecologically, the water involved can be sufficiently purified to be re-used. This effects a highly significant saving of water, and also of energy that would otherwise be required to bring new water to the elevated temperature required for film processing.

DESCRIPTION OF THE PREFERRED EMBODIMENTS

The apparatus with which the processes of this invention can be carried out has been disclosed in the patent application by David John Degenkolb and Fred James Scobey, the present co-inventors, entitled, "Method and Apparatus for Recovery of Heavy Metal Ions From Dilute Aqueous Solution", Ser. No. 764,669, filed in the U.S. Patent & Trademark Office on Feb. 1, 1977; now U.S. Pat. No. 4,137,290, issued Jan. 30, 1979.

The disclosure of that application is specifically incorporated herein by reference. The ownership of the two patent applications is common.

Chemically, any one of a number of certain groups of ion exchange resins can be used to accomplish processing according to this invention.

Preferably, these are a polystyrene of the strong base type. However, an epoxy-amine, a polyacrylic, or a phenolic, are alternates. This selection is treated in detail in the examples that are given later herein.

Typically, the recovery of silver, iron as ferricyanide or ferrocyanide, and/or chromium as dichromate requires an anion resin.

One significant choice of the agent to regenerate the resin and thereby separate the silver or equivalent heavy metal anion from the resin is the choice of ammonium chloride, $NH_4Cl$, maintained alkaline. The solution is made alkaline by adding small amounts of a caustic, such as sodium hydroxide, to give a pH of typically 8.5.

The alkaline state prevents the precipitation of silver chloride. Such is undesired, unless this mode is employed to recover the silver as a solid substance. Under all conditions precipitation is to be prevented in the vessels containing the resin, since the precipitate tends to coat the resin and reduce its effectiveness in originally absorbing the silver anion.

The ammonium chloride agent can be repeatedly re-used and it constitutes a preferred electrolytic solution, out of which the silver metal can be plated, as hereinafter to be described.

Of further importance with respect to the ammonium chloride agent is the self-formation of an adulterated solution upon the repeated use of the same.

It has been reliably found that used ammonium chloride solution is approximately 25% more effective in recovering the silver ion from the resin than is the substantially pure ammonium chloride solution as used in the first recovery cycle.

A new solution obviously contains essentially only ammonium chloride.

Typically, the used solution will contain:

| | |
|---|---|
| Thiosulfate ($S_2O_3$) (anions) | 5% |
| Ammonium chloride | 20% |
| Gelatin (N) | 2.6% |
| Silver (cations) | 140 mg/liter |

Persistent effort has not provided a certain explanation as to why the used solution regenerates significantly better than a new solution.

However, it is believed that the presence of the thiosulfate ion in the used solution accounts for the improvement in regeneration. This ion is a regenerant in its own right, but not as efficient one as ammonium chloride.

Either of two theories may explain the result. These are offered here for informational purposes; not having an influence upon the technical validity of the invention.

The dynamic theory proposes that the ammonium chloride initially forms a complex with the silver in removing it from the complex with the resin, but that the thiosulfate subsequently takes the silver away from the chloride. This leaves the chloride to again remove silver from the resin. In this way the one-fourth greater efficiency is obtained.

The synergistic theory merely proposes that for a reason not yet evident the presence of the two regenerants give more efficient regeneration.

Additionally, the gelatin may enter the synergism.

In any event, the circumstances are similar to the well-known effect in photography of the four-fold increase in the amount of processability obtained when both of the developers metol and hydroquinone are present, over that obtained when only one is present. The effect has been termed "superadditive", a word which defines the circumstances, but which does not explain.

The re-use of the ammonium chloride contributes significantly to the cost-effectiveness of the process of this invention. Such a factor has often been lacking in the prior art. In a Russian technique the relatively expensive resin has had to be burned in order to recover the metallic silver from the resin.

When re-use of the water effluent is desired, for economy, and the energy saving possible, the use of sodium chloride is preferred in typical situations.

When ferricyanide or ferrocyanide is present, when the level of these anions reaches one gram per liter, the sodium chloride or ammonium chloride solution will no longer regenerate the resin. The ellutant must, therefore, be discarded, and the much lower cost of sodium chloride ("salt") is then significant.

It has also been found that the resin may pack when used in full plant commercial quantities, causing a backup of a photographic solution in such apparatus, with the serious consequences previously recited above as to the prior art.

It has been found that treatment of packed resin with an alkali metal hydroxide, notably sodium hydroxide, reverses the packed condition. A 4% sodium hydroxide solution, when allowed to remain in contact with the packed resin for a period of approximately one hour, causes it to swell to about one-fourth greater volume. This results in a "fluffing" that restores the original rate of flow conditions.

The treatment with the hydroxide can be relatively infrequent; only after a large number of usual regenerations with the ammonium chloride solution, or equivalent solution.

It is necessary to give concern to the possibility of "fines" during the life of the processing entity. Fines are small bits of resin that break away from normal resin grains during the life of the resin. These clog screens that are necessarily used in the resin tanks to retain the resin in the tanks. Such clogging has the same undesirable effect of reducing the rate of flow of the liquid as does packing of the resin bed itself.

The preferred processing entails treating the resin with the hydroxide first. This breaks off any fines that have not quite broken off of the resin grains. Thereafter, the tanks are back-washed with water to remove the fines from the screens.

Backwashing is performed when a noticeable buildup in pressure is detected, such as a 363 gram per square centimeter increase; or it may be performed as a part of the regeneration cycle.

In backwashing, water is injected at the bottom of the tank (vessel) at a rate typically of 10 to 12 liters per minute per square meter of resin surface at 21° C. The rate may be increased to approximately 15 l/m/sq. m. if desired. The water is discharged through an open pipe, bypassing the screens to the sewer. The process takes approximately 15 minutes and utilizes 1,263 to 3,368 liters of water per cubic meter of resin.

Ammonium chloride is a preferred elluting agent, but any halide salt, such as potassium chloride, sodium bromide, sodium iodide, may be employed at reduced efficiency.

The term "alkali metal halide" as used herein includes ammonium in the well-known classification of this substance, as well as potassium and sodium.

Other ellutants are also effective, as a thiosulfate, a thiocyanate, and a thiourea.

From the ecological standpoint, as protection of the environment by maintaining the purity of water, the present invention may be applied singly or plurally with respect to the noxious ions that are to be eliminated from the effluent.

The silver anion is regarded as one such noxious ion and the process for removing it from the effluent has been set forth above.

An iron anion, such as may originate from a ferricyanide, as potassium ferricyanide employed in photographic processing, is also regarded as noxious.

This also includes iron at a different oxidation level, as the ferrocyanide.

The chromium anion, as dichromate, is also included in the accepted definition of heavy metals.

Where the ferricyanide, ferrocyanide and/or dichromate originate at a source separate from the silver, or from each other, separate resin-containing vessels can be hydraulically connected to handle the effluents separately.

In such a situation some flexibility as to the resin and the regenerant is allowable. For example, the use of a weak base resin of the polyfunctional amine phenolic type, such as the Diamond-Shamrock A7, with ammonium chloride or perhaps sodium chloride as the regenerant, may be indicated for the iron and/or chromium anions.

Where plural anions, as silver and ferricyanide, originate at the same source, then either of two modes of processing may be used.

A tandem, or in-series, arrangement has a first resin vessel or vessel pair (tank or tank pair) that largely removes the ferricyanide. With this accomplished, the silver is then more simply and completely removed, subsequently, by the second vessel(s).

The mechanism appears to involve acceptance of both silver and ferricyanide at resin sites initially in the first vessel(s). When these become filled, further incoming dilute aqueous solution causes the silver to be ejected from sites and replaced by ferricyanide. When the ferricyanide passes from the first to the second vessel(s), as determined by monitoring when this condition is considered likely to occur after relatively long continued use, then the first and second vessels are regenerated.

Regeneration can be accomplished by flowing 5 molal sodium chloride through the resin bed as detailed in the Examples which follow. This regenerates both the silver and the ferricyanide (and/or ferrocyanide) sites.

Alternately, the first in line ferricyanide vessels may contain a weak base resin and may be regenerated as set forth directly above.

The second in line silver recovery vessels may contain a strong base resin and employ "used" ammonium chloride as the regenerant. This has been set forth earlier herein and is detailed in Example 1, which follows.

A further alternate structure-flow arrangement is also possible. Only one vessel is used. The resin is preferably of the strong base type, a quaternary ammonium, type 2, polystyrene, such as the Diamond-Shamrock 102D.

In this example, the effluent contains both the ferricyanide and the silver anions and is flowed through the vessel. The resin forms a complex in situ of them both.

In this alternate the ferricyanide (ferrocyanide) anion is first removed by regenerating with a caustic, such as sodium hydroxide at 1 molar concentration.

Subsequently, the silver anion, as from the thiosulfate complex from photograhic processing, is then removed with ammonium chloride, preferably a "used" solution having an initial five molar concentration. This is according to the processing previously set forth, from which the silver metal can be obtained by electroplating, or by precipitation.

This mechanism continues on for the chromium anion as dichromate. Any or all of silver, ferricyanide, ferrocyanide and dichromate can be elluted from one or more resin beds.

When dichromate may be present and ferricyanide absent, a pH of 3 is typical for the dichromate solution.

When the wash water is sufficiently purified, as set forth above, to be reusable in film processing, water conservation is also accomplished.

A single motion picture photographic developing machine requires 76 liters of water per minute. When the water is reused the consumption is reduced to a very few liters per minute; just sufficient new water to make up for inescapable minor losses.

Additionally, there is a significant saving of energy when the water is reused. Typically, water is used at 27° C. in photographic processing. In the winter, even in Southern California, the water may be supplied from the supply mains at 10° C. Considerable heating energy is thus required if all of the water that is used is new from the mains.

Very little heating is required if the previously heated water is reused.

The invention can be practiced in accordance with any of the several full-scale examples set forth below.

EXAMPLE 1

The fixing bath for photographic processing typically consists of sodium or ammonium thiosulfate, $Na_2S_2O_3$ or $(NH_4)_2S_2O_3$. This becomes the thiosulfate-silver ion complex $Ag(S_2O_3)_2$ upon use of the solution. It is from this ion complex that the silver is recovered.

The very dilute solution of interest in this invention arises from the wash water bath through which the film is passed after having passed through the fixing bath. The discharge of this wash water to the sewer from either a motion picture or a still-film processing laboratory may be at the rate of in the range of from 480 to 600 liters per minute, more or less.

It may contain, for example, 7 parts per million (ppm) of the heavy metal ion involved, or some other value within the range of from 0.04 to preferably less than 25 ppm where ecology is involved.

In particularly this first example, the resin used for reclaiming the silver and making the effluent that goes to the sewer ecologically acceptable is a cross-linked polystyrene with quaternary ammonium functional groups of the general formula R $C_6H_4CH_2N(CH_3)_3Cl$. The initial "R" is symbolic, standing for "resin" and not a chemical element.

This is a strong-base anion resin. Typically, the mobile ion is the chloride, which is exchanged for the silver thiosulfate.

The resin may be commercially obtained as Duolite A101D ion exchange resin, from the Diamond Shamrock Chemical Co., Nopco Chemical Division, Redwood City, Calif. 94063. The resin is a semi-porous grade and has particles about 0.5 millimeters (mm) in size. It has a superior characteristic for the flow of liquid through the resin and thus is preferred for this invention.

For a flow of 480 liters per minute per containing vessels as required the preferred volume of resin is 1.8 cubic meters.

The resin may be contained in eight pairs of reinforced fiber-glass pressure vessels, typically long cylinders having polyvinyl chloride plumbing. Each has a volume of 151 liters and is hydraulically connected as set forth in the previously referred-to patent application, Ser. No. 764,669.

The previously mentioned flow of dilute aqueous solution can be accomplished with a pressure of the order of 2.8 kilograms per square centimeter (kg./sq.cm.).

After about two-hundred hours of operation the resin is regenerated, at which time about 20% of silver leaks by. The regeneration may be earlier, if desired, with correspondingly lower leakage.

The preferred regenerant is a 5 molal concentration of ammonium chloride, $(NH_4)Cl$ solution. This is strongly in excess of stoichiometric requirements and approaches a saturated solution.

This regenerant solution is flowed through a pair of pressure vessels that are taken off of the line of plural vessels by suitably closing valves. The other of the plural vessels handle the flow of the wash water that needs to be treated, so that the process as a whole can be a continuous one.

The total regenerant flow is 1,900 liters per pair of vessels, and is preferably at a rate of 6 liters per minute for a period of 317 minutes. This flow contacts 0.226 cubic meters of resin.

The resulting silver chloride solution contains approximately 0.75 grams/liter of silver. This solution is subsequently introduced to an electroplater apparatus having an electrical voltage of approximately 0.6 volt, d.c.

An alternate mode of accomplishing the electroplating consists in adding an additional ion to the silver-containing solution.

The addition of 10 grams per liter of sodium sulfite, $Na_2SO_3$, provides a compatible ion.

With the sulfite included the voltage may be raised to about 1.2 volts, d. c.. This gives about twice as fast recovery of the silver without chemical breakdown of the system.

The sulfite may be added when the ammonium chloride solution is first prepared and may remain a part of the regenerative solution.

The regenerant solution is maintained alkaline, at a pH slightly greater than 7. This is accomplished by adding minute amounts of NaOH, if required.

Metallic silver is plated-out on a stainless steel electrode. An electric current of the order of 31 amperes per square meter of electrode for a period of 12 hours is typically employed to recover the silver in the process at the 0.6 voltage and correspondingly less at the 1.2 voltage.

The remaining used ammonium chloride solution, now devoid of silver, is returned to a storage tank, from which it can be reused again and again.

The system is cost-effective above a break-even point of 3 ppm of silver ion in the incoming dilute aqueous solution.

EXAMPLE 2

The same incoming solution, resin, apparatus, rate of flow and the general aspects of the processing of Example 1 are retained.

Five molal ammonium chloride is also employed as the regenerant, but the same is maintained acid, as by adding small amounts of hydrochloric acid, HCl, to obtain a pH in the range of 5 to 6.

The silver, after removal from the resin, precipitates somewhat slowly as silver chloride, AgCl, under such circumstances.

In practice, a time interval of 24 hours is allowed for the precipitation.

EXAMPLE 3

The same process as in Example 1, save that a Type II resin is used rather than a Type I. A typical Type II resin is the Duolite A102D, which is also chemically a strong-base polystyrene resin with quaternary ammonium functional groups.

The chief operative difference when applied to the processing of this invention is a higher capacity to absorb silver from the weak solution and the same ease of regeneration to remove the silver from the resin for subsequent recovery with respect to the Type I resin of Example 1.

This was an unexpected result, indicating the change in chemistry when dealing with very weak solutions.

EXAMPLE 4

The same process as in Example 2, save that a Type II resin is used rather than a Type I. A typical Type II resin is the Duolite A102D.

The chief operative difference, when applied to the processing according to this invention, is as set forth in Example 3.

EXAMPLE 5

The same process as in Example 1, save that 5 molal sodium chloride is used for regenerating the resin and removing the silver complex from it, rather than ammonium chloride.

The chief operative difference, when applied to the processing according to this invention, is that salt does not remove the silver complex as efficiently as ammonium chloride, being about 75% as efficient as ammonium chloride.

The cost of salt is one-tenth that of ammonium chloride.

There are system circumstances where it is convenient to throw the regenerant away.

One is where ferricyanide or ferrocyanide are present in the incoming wash water and these are to be ecologically eliminated.

A similar situation obtains with dichromate anions.

Another circumstance is when the effluent water from the resin contact is to be reused for photographic processing instead of being discharged to the sewer.

Sodium chloride removes the silver, ferricyanide, ferrocyanide and dichromate anions, but in so doing residual effects enter so that it is convenient to throw the used salt solution away.

EXAMPLE 6

The same process as in Example 2, save that 5 molal sodium chloride is used for regenerating the resin and removing the silver complex from it, rather than with ammonium chloride.

The chief operative difference when applied to the processing of this invention is the same as was noted for Example 5.

EXAMPLE 7

The same general process as in Example 2, save that a weak base resin is employed instead of the strong base resin previously specified.

A suitable weak base resin is a polyfunctional amin phenolic, available commercially in the Duolite A7 resin.

The resin is regenerated by flowing a 5 molal solution of ammonium chloride through it as previously set forth.

The operative difference when applied to this processing is that the pH is maintained in the range of from 0 to 6.

EXAMPLE 8

A similar condition to that set forth with respect to the wash waters from photographic development occurs in the wash waters of the mirror-silvering process.

The anti-ecological element is again silver. It is usually bound in the complex $Ag[(NH_4)Cl]^{-1}$.

Processing according to Example 1 (plating) is suitable.

This utilizes the A101D strong-base resin, and regeneration with ammonium chloride.

EXAMPLE 9

The general aspects of this example follow Example 1, save that plural noxious ions, say two, are present in the effluent from the industrial process and these are serially removed.

Typically, the effluent may contain the iron ion as a ferricyanide, such as potassium ferricyanide, in a concentration of the order of 50 to 500 milligrams per liter.

The effluent is conducted to an ion-exchange resin bed in a first single or pair of vessels. Each vessel may have a capacity of 151 liters and contain 60% of that volume in resin. The hydraulic structure may be according to the copending patent application, Ser. No. 764,669, previously referred to.

A weak base resin is preferred, of the polyfunctional amin phenolic type, such as Diamond Shamrock type A7, in a volume of 0.113 cubic meters per vessel.

After a period of flow, normally measured in many tens of hours, the resin bed is regenerated. The preferred regenerant is one molar alkali metal hydroxide, such as sodium hydroxide.

An amount of 1,000 liters is flowed at a rate of 8 liters per minute to regenerate the amount of resin stated.

The iron is present in the regenerant in the form of sodium ferrocyanide. It is recovered from the system by precipitation.

In further accomplishing the processing, the effluent is conducted to a second ion-exchange resin bed, contained in a second single or pair of vessels.

Here a strong base resin is preferred, of the cross-linked polystyrene type with quaternary ammonium functional groups, Type I, such as the Diamond-Shamrock A101D. A volume of 0.113 cubic meters per vessel of this resin is suitable.

After a period of functioning flow, normally measured in many tens of hours, this resin bed is also regenerated. The preferred regenerant is the nominal 5 molal ammonium chloride. The "used" composition is preferred, with the synergistic elements present according to the composition previously given herein.

For the 0.113 cu. m. of resin per vessel, 2,000 liters of regenerant is preferred, being flowed through the resin bed at a rate of 11.3 liters per minute.

The resulting silver chloride solution can be reduced to metallic silver by electro-plating according to Example 1 above, or to solid silver chloride according to Example 2.

After regeneration of both of the resin beds the vessels are returned to the line to accept further incoming effluent from the industrial processing, and the cycle is repeated for as long as desired.

Also, the thus processed effluent water is sufficiently pure to be reused in the industrial process from which it originated.

EXAMPLE 10

The general aspects of this example follow Example 9.

The regeneration processing, however, takes place serially in time. The resin is contained in only one vessel, or in one pair of vessels to allow backflow.

Preferably, there is employed 0.113 cu. m. of resin. This may be either the strong base polystyrene resin with quaternary ammonium functional groups, Type II, as the Diamond Shamrock A102D, or the weak base polyfunctional amin phenolic, as the Duolite A7.

After a period of flow of the incoming effluent of approximately half of the period according to Example 1, the resin bed is regenerated. This shorter period is necessary because two types of ions are being absorbed by the same resin bed.

A preferred regenerant is 1 molar sodium hydroxide in the amount of 1,000 liters for the weak base resin and 2,000 liters for the strong base resin. This is flowed at the rate of 8 liters per minute for the amount of resin being considered.

The iron present in the regenerant is in the form of NA4Fe(CN)6. It is recovered from the system by precipitation, as in Example 9.

Normally, directly after the iron ion has been removed from the resin, the silver ion is also removed by further regenerating the resin.

This is preferably accomplished by flowing 2,000 liters of "used" nominally 5 molar ammonium chloride through the resin bed at a rate of 8 liters per minute. These values are for 0.113 cu. m. of resin per vessel, and are to be proportional for greater or lesser amounts of resin.

The silver can be obtained in metallic form by electro-plating according to Example 1 above, or in the form of solid silver chloride according to Example 2.

EXAMPLE 11

The general aspects of this example, for the removal of chromium in the form of dichromate as an anionic complex ion, follow Example 1.

The resin may preferably be the strong-base anion cross-linked polystyrene with quaternary ammonium functional groups, Type 1. This resin is commercially available as the Duolite A101D, Type I.

A typical volume of resin may be 0.17 cubic meters, equally contained in two vessels having a total volume of 0.282 cubic meters.

This arrangement can handle an inflow of dilute aqueous solution of 57 liters per minute.

The regenerant is preferably ammonium chloride, at a concentration in excess of 17%. While the excess may be varied, two illustrative percentages are 21% and 25%. The latter is 5 molal.

The regenerant is flowed through the resin at a rate of 11 liters per minute.

A flow for two hours accomplishes 95% recovery of chromium, an amount of 2 kilograms in the illustrative example here.

We claim:

1. The process of recovering an anionic complex ion selected from the group consisting of silver as thiosulfate; iron as ferricyanide, iron as ferrocyanide, and chromium as dichromate from a dilute aqueous solution having a concentration of said ion within the range of 0.04 and 25 parts per million in the presence of thiosulfate ion at a concentration in excess of 30 to 1 with respect to the concentration of said anionic complex ion, that comprises the process steps of;
   (a) flowing said solution into contact with an anion ion exchange resin selected from the group consisting of a cross-linked polystyrene resin with quaternary ammonium functional groups, an epoxyamine, a polyacrylic, and a polyfunctional amine phenolic resin,
   (b) flowing the effluent of said solution from said resin,
   (c) subsequently flowing into contact with said resin a concentrated solution in excess of 17% concentration of a compound selected from the group consisting of ammonium chloride, sodium chloride, sodium bromide, sodium iodide, sodium thiosulfate and ammonium thiosulfate at a pH in excess of 7 to recover the said anionic ion from said resin, and
   (d) isolating the said anionic ion from said concentrated solution of a compound as a solid.

2. The process of claim 1, in which;
   (a) said resin has the general formula

   R C6H4CH2N(CH3)3Cl

3. The process of claim 1, in which;
   (a) said concentrated solution contains the silner chloride ion;
   (b) that solution is acidified to a pH in the range of 3 to 6, and
   (c) the said anionic ion is recovered as a solid by precipitation as silner chloride.

4. The process of claim 1, in which;
   (a) said concentrated solution has a molal concentration of the order of five.

5. The process of claim 1, which includes the additional separate step of;
   (a) periodically flowing an alkali metal hydroxide into contact with said resin for a time interval of approximately one hour, to physically expand the particles of said resin.

6. The process of claim 1, which includes an additional last process step of;
   (a) returning said dilute aqueous solution, after it has been in contact with said ion exchange resin, to the process in which further said anionic ions again enter said dilute aqueous solution.

7. The process of reconering an anionic complex ion selected from the group consisting of silver as thiosulfate, iron as ferricyanide, iron as ferrocyanide, and chromium as dichromate from a dilute aqueous solution having a concentration of said ion within the range of 0.04 and 25 parts per million in the presence of thiosulfate ion at a concentration in excess of 30 to 1 with respect to the concentration of said anionic complex ion, that comprises the process steps of;
   (a) flowing said solution into contact with an anion ion exchange resin,
   (b) flowing the effluent of said solution from said resin,
   (c) subsequently flowing a solution having a concentration in excess of 17% of a salt selected from the group consisting of a thiosulfate, a thiocyanate, and a thiourea, into contact with said resin to recover the said anionic complex ion from said resin, and
   (d) isolating the selected metal from the solution of said salt as a solid.

8. The process of recovering plural different anionic complex ions selected from the group consisting of silver as thiosulfate, iron as ferricyanide, iron as ferrocyanide, and chromium as dichromate from a dilute aqueous solution having concentrations of said ions within the range of 0.04 and 25 parts per million in the presence of thiosulfate ion at a concentration in excess of 30 to 1 with respect to the concentrations of said anionic complex ions, that comprises the process steps of;
   (a) flowing said dilute aqueous solution into contact with a first ion exchange resin to absorb a first anionic ion selected from the group consisting of iron as ferricyanide, iron as ferrocyanide, and chromium as dichromate, upon said first ion exchange resin,
   (b) subsequently flowing said dilute aqueous solution into contact with a second ion exchange resin to absorb a second anionic ion, silver as thiosulfate, upon said second ion exchange resin,
   (c) ceasing the flow of said dilute aqueous solution,
   (d) subsequently flowing a first regenerative solution into contact with said first ion exchange resin to recover said first anionic ion from said first ion exchange resin,
   (e) also subsequently flowing a second regenerative solution into contact with said second ion exchange resin to recover said second anionic ion from said second ion exchange resin, and
   (f) subsequently resuming the flow of said dilute aqueous solution.

9. The process of claim 8, which additionally includes a last process step of;
   (a) returning said dilute aqueous solution after it has been in contact with both said first and second resins to the process in which further said first and second anionic ions again enter said dilute aqueous solution.

10. The process according to claim 8, in which;
    (a) said second ion exchange resin absorbs an alkali metal halide ion,
    (b) said first ion exchange resin is a weak base resin, and
    (c) said second ion exchange resin is a strong base resin.

11. The process according to claim 8, in which;
    (a) both said first and second ion exchange resins are strong base resins.

12. The process of recovering plural different anionic complex ions selected from the group consisting of silver as thiosulfate, iron as ferricyanide, iron as ferrocyanide, and chromium as dichromate from a dilute aqueous solution having concentrations of said ions within the range of 0.04 and 25 parts per million in the presence of thiosulfate ion at a concentration in excess of 30 to 1 with respect to the concentrations of said anionic complex ions, that comprises the process steps of;
    (a) flowing said dilute aqueous solution into contact with an ion exchange resin.
    (b) ceasing the flow of said dilute aqueous solution,
    (c) subsequently flowing a first regenerative solution into contact with said ion exchange resin to recover a first anionic ion selected from the group consisting of iron as ferricyanide, iron as ferrocyanide, and chromium as dichromate, from said ion exchange resin,
    (d) thereafter flowing a second regenerative solution into contact with said ion exchange resin to recover a second anionic ion, silver as thiosulfate, from said ion exchange resin, and
    (e) subsequently resuming the flow of said dilute aqueous solution.

13. The process of claim 12, which includes a last process step of;
    (a) returning said dilute aqueous solution, after it has been in contact with said ion exchange resin, to the process in which further plural different said anionic ions again enter said dilute aqueous solution.

14. The process according to claim 12, in which;
    (a) the ion exchange resin is selected from the group consisting of a strong base resin and a weak base resin,
    (b) said first regenerative solution is an alkali metal hydroxide, and
    (c) said second regenerative solution is selected from the group consisting of an ammonium halide and a sodium halide.

15. The process of recovering a silver thiosulfate anionic complex ion from mirror-plating wash water dilute aqueous solution having a concentration of said ion within the range of 0.04 and 25 parts per million, that comprises the process steps of;
    (a) flowing said dilute aqueous solution into contact with a strong-base anion cross-linked polystyrene resin with quaternary ammonium functional groups,
    (b) flowing the effluent of said dilute aqueous solution from said resin,
    (c) subsequently flowing into contact with said resin a concentrated solution in excess of 17% concentration of ammonium chloride, to regenerate said resin, and (d) isolating the said anionic complex ion from said concentrated solution as a silver-containing solid.

16. The process of recovering a silver as thiosulfate anionic complex ion from a dilute aqueous solution having a concentration of said ion within the range of 0.04 and 25 parts per million in the presence of thiosulfate ion at a concentration in excess of 30 to 1 with respect to the concentration of said anionic complex ion, that comprises the process steps of;

(a) flowing said solution into contact with an anion ion exchange resin selected from the group consisting of a cross-linked polystyrene resin with quaternary ammonium functional groups, an epoxyamine, a polyacrylic, and a polyfunctional amine phenolic resin, (b) flowing the effluent of said solution from said resin, (c) subsequently flowing into contact with said resin a concentrated solution in excess of 17% concentration of a compound selected from the group consisting of ammonium chloride, sodium chloride, sodium bromide, sodium iodide, sodium thiosulfate and ammonium thiosulfate at a pH in excess of 7 to recover the said anionic ion from said resin, and (d) electroplating out metallic silver from said concentrated solution after flowing the same from said resin.

* * * * *